(12) United States Patent
Matsuzawa et al.

(10) Patent No.: US 10,515,229 B2
(45) Date of Patent: Dec. 24, 2019

(54) INFORMATION DISCRIMINATING DEVICE, INFORMATION DISCRIMINATING METHOD, AND NON-TRANSITORY STORAGE MEDIUM STORING INFORMATION DISCRIMINATING PROGRAM

(71) Applicant: Olympus Corporation, Hachioji-shi, Tokyo (JP)

(72) Inventors: Yoshinori Matsuzawa, Hachioji (JP); Masaomi Tomizawa, Hachioji (JP); Sumio Kawai, Hachioji (JP); Hideaki Yoshida, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 60 days.

(21) Appl. No.: 15/193,260

(22) Filed: Jun. 27, 2016

(65) Prior Publication Data
US 2016/0378958 A1 Dec. 29, 2016

(30) Foreign Application Priority Data

Jun. 29, 2015 (JP) ................. 2015-1300063

(51) Int. Cl.
*G06K 9/00* (2006.01)
*G06F 21/62* (2013.01)

(52) U.S. Cl.
CPC ...... *G06F 21/6227* (2013.01); *G06F 21/6245* (2013.01); *G06K 9/00671* (2013.01)

(58) Field of Classification Search
CPC ............ G06F 21/6227; G06F 21/6245; G06K 9/00671

(Continued)

(56) References Cited

U.S. PATENT DOCUMENTS 6,222,538 B1* 4/2001 Anderson ............ G06F 3/0481
                                                        396/287
7,324,670 B2* 1/2008 Kozakaya .......... G06K 9/00228
                                                        382/115

(Continued)

FOREIGN PATENT DOCUMENTS

JP     H10-320576 A    12/1998
JP     2008-123546      5/2008

(Continued)

OTHER PUBLICATIONS

First Office Action to corresponding Japanese Patent Application Serial No. 2015-130063, dated Feb. 5, 2019, (9 pgs.), with translation (13 pgs.).

(Continued)

*Primary Examiner* — Harunur Rashid
*Assistant Examiner* — Sakinah White Taylor
(74) *Attorney, Agent, or Firm* — John C. Pokotylo; Pokotylo Patent Services

(57) ABSTRACT

An information discriminating device includes an information acquiring unit, an information discriminating unit, and an information superimposing unit. The information acquiring unit acquires private information to be privately used by a user of the information discriminating device. The information discriminating unit discriminates a public information portion that is also usable as public information accessible by a special majority in the private information acquired by the information acquiring unit from a private information portion unusable as the public information. The information superimposing unit superimposes the private information portion on the public information.

18 Claims, 13 Drawing Sheets

(58) Field of Classification Search
USPC .......................................................... 726/33
See application file for complete search history.

(56) References Cited

U.S. PATENT DOCUMENTS

| | | | | |
|---|---|---|---|---|
| 9,881,207 | B1* | 1/2018 | Nguyen | G06K 9/00369 |
| 10,102,226 | B1* | 10/2018 | Cosic | G06F 16/5866 |
| 2008/0068456 | A1* | 3/2008 | Fujii | G11B 27/105 |
| | | | | 348/130 |
| 2008/0232712 | A1 | 9/2008 | Matsui et al. | |
| 2010/0046842 | A1* | 2/2010 | Conwell | G06K 9/228 |
| | | | | 382/218 |
| 2010/0118161 | A1 | 5/2010 | Tsurumi | |
| 2011/0202968 | A1* | 8/2011 | Nurmi | G06F 21/10 |
| | | | | 726/1 |
| 2011/0221779 | A1* | 9/2011 | Okumura | H04N 5/2254 |
| | | | | 345/649 |
| 2012/0230539 | A1* | 9/2012 | Calman | G06Q 10/06 |
| | | | | 382/103 |
| 2012/0314935 | A1* | 12/2012 | Cheng | G06K 9/00671 |
| | | | | 382/154 |
| 2013/0071012 | A1 | 3/2013 | Leichsenring et al. | |
| 2013/0182108 | A1* | 7/2013 | Meadow | G06T 17/05 |
| | | | | 348/143 |
| 2014/0002860 | A1* | 1/2014 | Miyata | G06K 15/002 |
| | | | | 358/1.15 |
| 2014/0185871 | A1* | 7/2014 | Ito | G06K 9/00671 |
| | | | | 382/103 |
| 2015/0078667 | A1* | 3/2015 | Yun | G06K 9/6201 |
| | | | | 382/195 |
| 2015/0153934 | A1 | 6/2015 | Zherebtsov et al. | |
| 2017/0003933 | A1* | 1/2017 | Kobayashi | G06F 3/16 |

FOREIGN PATENT DOCUMENTS

| | | |
|---|---|---|
| JP | 2008-234518 A | 10/2008 |
| JP | 2009-151896 A | 7/2009 |
| JP | 2012-129961 A | 7/2012 |
| JP | 2014-207580 A | 10/2014 |
| WO | WO 2012/117729 A1 | 9/2012 |

OTHER PUBLICATIONS

Final Office Action to corresponding Japanese Patent Application Serial No. 2015-130063, dated Sep. 17, 2019 (3 pgs.), with English translation (2 pgs.).

* cited by examiner

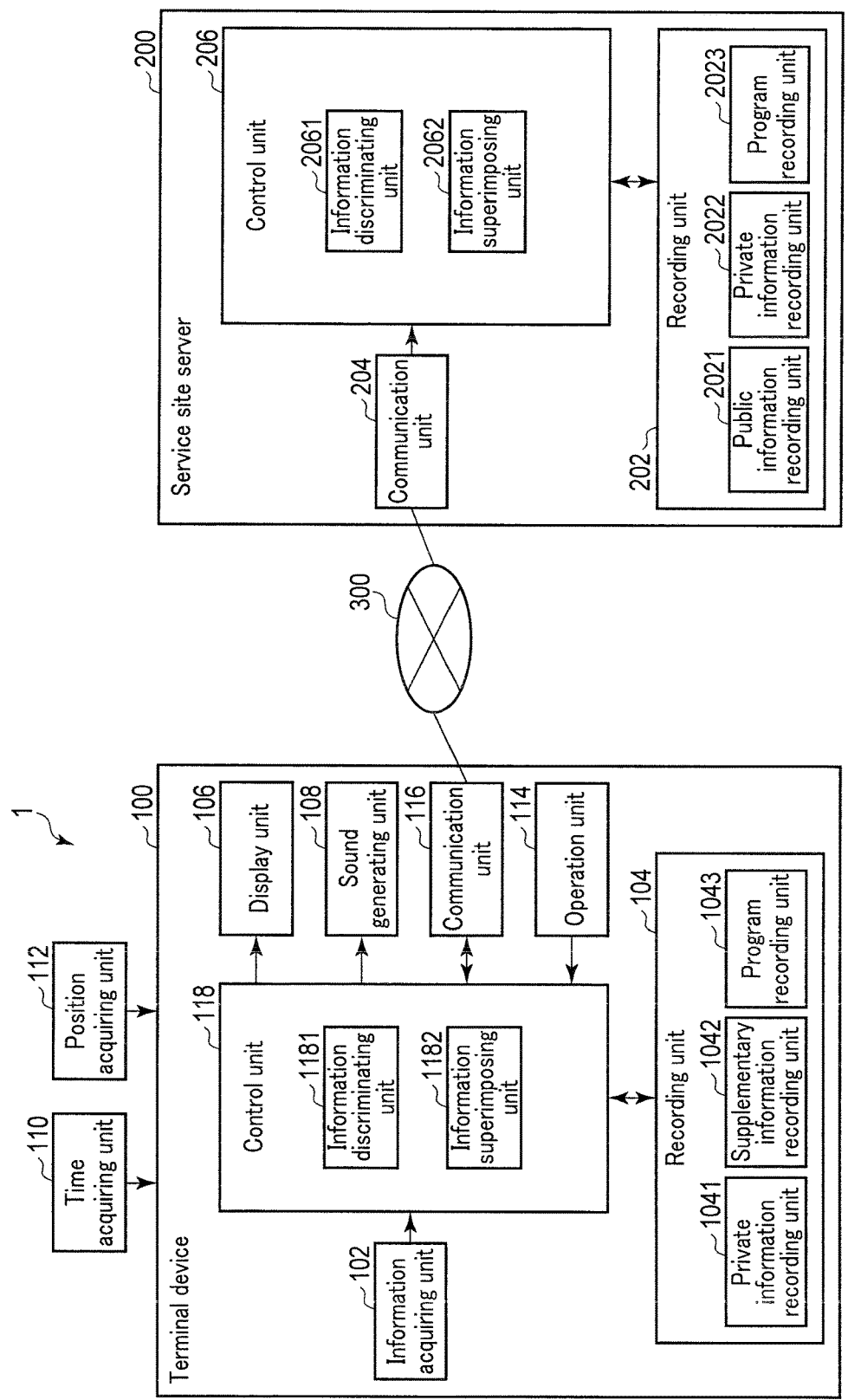
F I G. 1

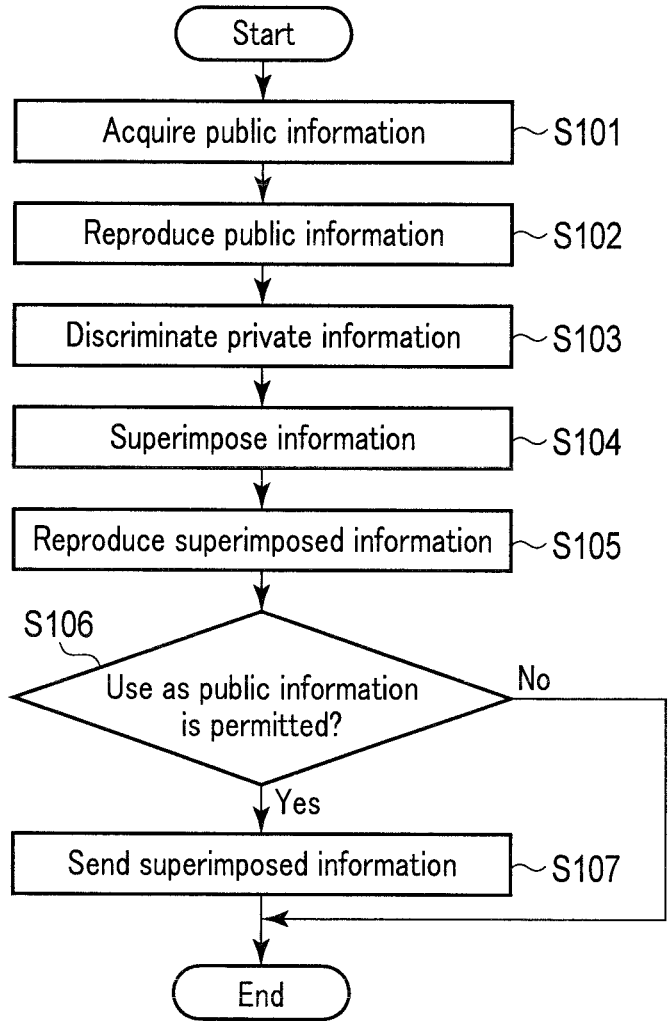
F I G. 7

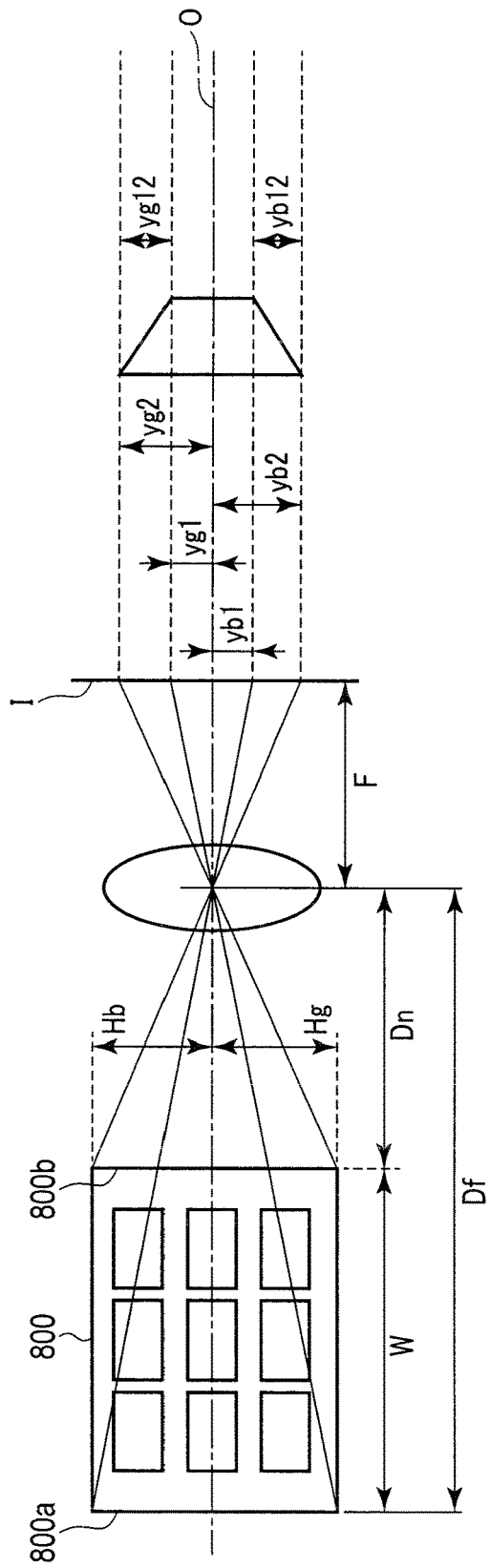
F I G. 9

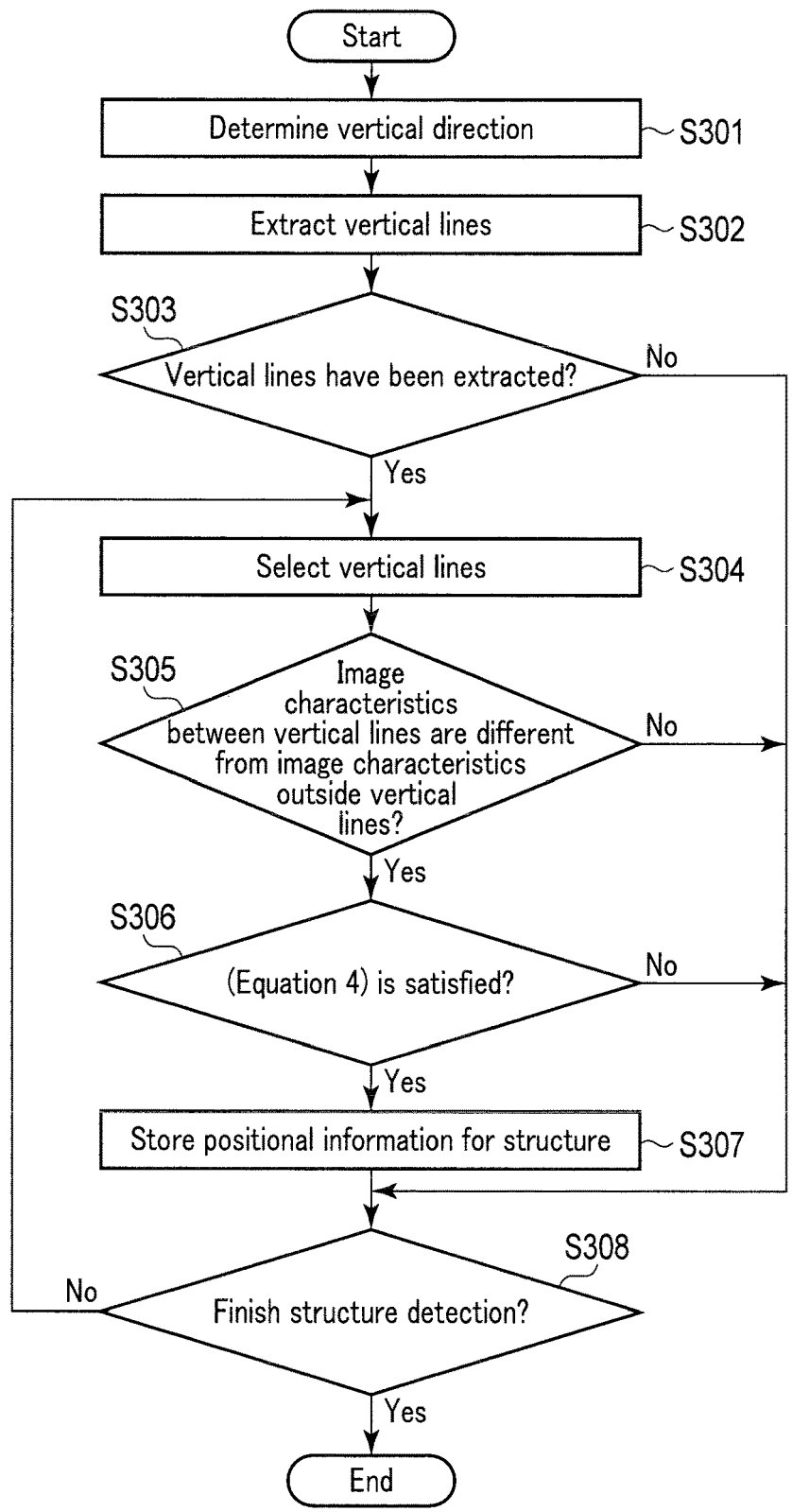
F I G. 11

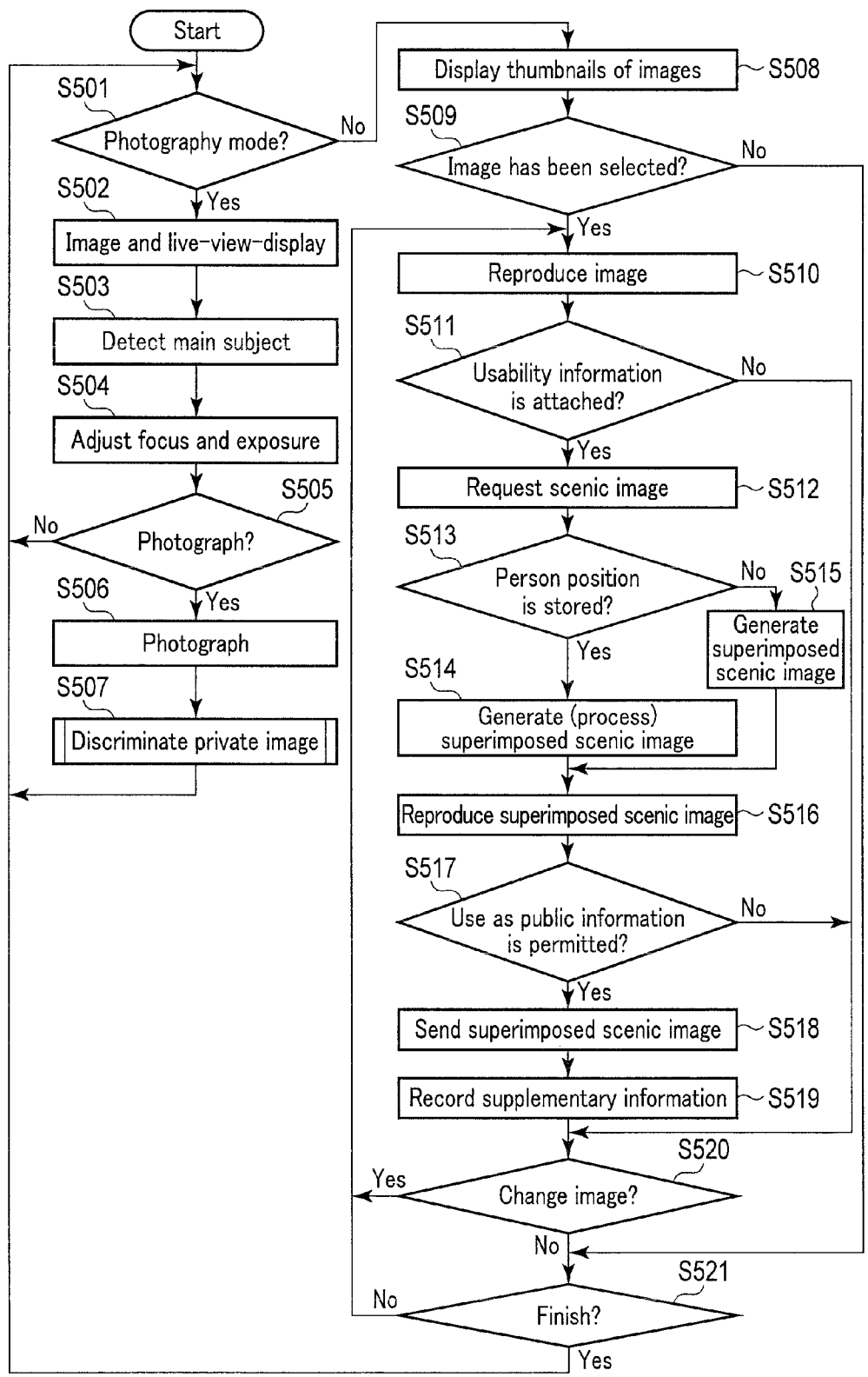
F I G. 13

INFORMATION DISCRIMINATING DEVICE, INFORMATION DISCRIMINATING METHOD, AND NON-TRANSITORY STORAGE MEDIUM STORING INFORMATION DISCRIMINATING PROGRAM

CROSS-REFERENCE TO RELATED APPLICATIONS

This application is based upon and claims the benefit of priority from prior Japanese Patent Application No. 2015-130063, filed Jun. 29, 2015, the entire contents of which are incorporated herein by reference.

BACKGROUND OF THE INVENTION

1. Field of the Invention

The present invention relates to an information discriminating device, an information discriminating method, and a non-transitory storage medium in which an information discriminating program is stored.

2. Description of the Related Art

Heretofore, there have been various suggestions to associate private information intended for personal use by a user with public information intended for use in public. For example, according to Jpn. Pat. Appln. KOKAI Publication No. 2008-123546, information indicating the types of music personally recorded by the user is acquired from public information recorded in a server.

BRIEF SUMMARY OF THE INVENTION

According to a first aspect of the invention, an information discriminating device comprises: an information acquiring unit which acquires private information to be privately used by a user of the information discriminating device; an information discriminating unit which discriminates a public information portion that is also usable as public information accessible by a special majority in the private information acquired by the information acquiring unit from a private information portion unusable as the public information; and an information superimposing unit which superimposes the private information portion on the public information.

According to a second aspect of the invention, an information discriminating method comprises: acquiring private information to be privately used by a user of an information discriminating device; discriminating a public information portion that is also usable as public information accessible by a special majority in the acquired private information from a private information portion unusable as the public information; and superimposing the private information portion on the public information.

According to a third aspect of the invention, a non-transitory storage medium stores a computer-readable program which causes a computer to: acquire private information to be privately used by a user of an information discriminating device; discriminating a public information portion that is also usable as public information accessible by a special majority in the acquired private information from a private information portion unusable as the public information; and superimposing the private information portion on the public information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 1 is a diagram showing the configuration of a communication system including an information discriminating device according to each embodiment of the present invention;

FIG. 7 is a flowchart showing a conceptual operation of a terminal device;

FIG. 9 is a diagram showing the relation between an actual structure and a structure on the scenic image in the case where a structure facing a road is photographed from, for example, an automobile running on this road;

FIG. 11 is a flowchart showing a specific example of structure detection processing;

FIG. 13 is a flowchart showing the operation of a terminal device as one specific example according to the second embodiment;

DETAILED DESCRIPTION OF THE INVENTION

Figure 2:
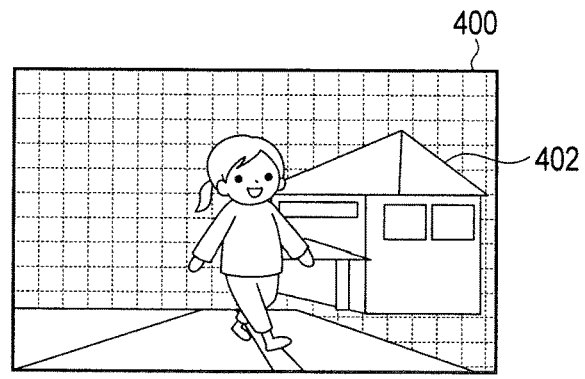
FIG. 2 is a diagram showing an example of a private image.

Hereinafter, embodiments of the present invention are described with reference to the drawings. FIG. 1 is a diagram showing the configuration of a communication system including an information discriminating device according to each embodiment of the present invention. As shown in FIG. 1, a communication system 1 has a terminal device 100 and a service site server 200. The terminal device 100 and the service site server 200 are connected to be able to communicate with each other via a network 300 such as an Internet connection. This configuration is used because a cloud environment enables operation with a higher degree of freedom. The terminal device 100 and the service site server 200 do not always need to be connected to each other via the network 300. One terminal device 100 is shown in FIG. 1. However, the communication system 1 may have more than one terminal device 100.

The terminal device 100 as an example of the information discriminating device is a terminal device such as a smartphone or a tablet terminal. The terminal device 100 has an information acquiring unit 102, a recording unit 104, a display unit 106, a sound generating unit 108, a time acquiring unit 110, a position acquiring unit 112, an operation unit 114, a communication unit 116, and a control unit 118.

The information acquiring unit 102 acquires private information. The private information is information to be recorded in the terminal device 100 for personal use by a user. The private information that can be acquired by the information acquiring unit 102 includes various information such as images and sounds, accompanying information such as the places and times of the acquisition of the images and the sounds, action records and face detection results that are obtained from the accompanying information, and processing information such as biological information including voiceprints. When the private information is an image, the information acquiring unit 102 is an imaging unit having a lens and an image pickup device. The information acquiring unit 102 may only comprise an interface to only acquire information from external equipment. The private information here is supposed to be personally used by an individual who has acquired the information. Actually, the private information may be information shared in a particular space or time range for the reason of an implicit contract or a clear contract based on a relation of trust such as a family, a limited circle, or a workplace. However, it is considered that public use of old photographs in which authors and subjects are unknown causes no problems. It is also considered that public use of photographs which are out of focus or which have incorrect exposure or in which facial identification is impossible causes no problems because personal identification is difficult. The explanation of the private information is continued below on the assumption that the private information is a portrait photograph in which an individual can be identified from the face or clothing or a photograph in which an individual can be identified from a car license plate, an address, or a nameplate. Meanwhile, when an acquirer of an image or a sound cannot be identified, extraction and reproduction of a photographed background image portion that is irrelevant to personal identification or an environmental sound portion separated from collected sound do not necessarily lead to a personal disadvantage. It can therefore be considered that such a background image portion or an environmental sound portion is a portion that does not need to be limited to private use but that can be shared. There are naturally subjects and sounds involving copyrights. Their public use is preferably prevented in the same way of thinking as the right of portrait, which is considered to fall within the present invention. Although there are various whether to pay or not and whether difficulties regarding registration is required in the case of a membership SNS, it may be considered that the term "public" is applicable to anything that can be viewed by a membership. Anything that is permitted by a rightful person to be in public with certain conditions may be considered to be public. Images may be scenes created by computer graphics or the like, and include images created or taken by a third party. One usage of images that may be assumed is to superimpose a personal image on a reproduction of an old scene.

The recording unit 104 is, for example, a flash memory, and records various information. This recording unit 104 has a private information recording unit 1041, a supplementary information recording unit 1042, and a program recording unit 1043. The private information recording unit 1041 is a recording unit to record private information acquired in the information acquiring unit 102. The supplementary information recording unit 1042 is a recording unit to record supplementary information which is generated as a result of information discriminating processing performed in the control unit 118. The program recording unit 1043 is a recording unit to record a control program for the control unit 118 of the terminal device 100 to control the terminal device 100, and various application programs. For example, a Web browser, a map display application, and a camera application are recorded as the application programs in the program recording unit 1043. The Web browser is an application to browse Web pages on the service site server 200. The map display application is an application for the terminal device 100 to function as a map display device to reproduce map information as public information. The camera application is an application for the terminal device 100 to function as a camera when the information acquiring unit 102 is an imaging unit.

The display unit 106 is, for example, a liquid crystal display, and displays various images. The sound generating unit 108 is, for example, a speaker, and emits various sounds.

The time acquiring unit 110 acquires various kinds of time by, for example, a clock. The position acquiring unit 112 is, for example, a GPS receiver, and acquires the current position of the terminal device 100. Information regarding the time and the current position are associated with the private information acquired by the information acquiring unit 102. The terminal device 100 may be configured to acquire the current bearing of the terminal device 100 by having a bearing detection unit such as an electronic compass. In this case, bearing information is also associated with the private information. In addition, for example, a barometer to measure altitude and an acceleration sensor are also used in some cases to determine the action of the user so that relevant information may be available.

The operation unit 114 is an operational component to receive the operation of the terminal device 100 by the user. The operation unit 114 is an operational component such as an electric power supply button or a touch panel.

The communication unit 116 includes a communication interface to communicate with the service site server 200 via the network 300. The communication unit 116 communicates with the service site server 200 via, for example, a wireless LAN circuit or a mobile telephone connection. The communication unit 116 does not always need to be configured to communicate with the service site server 200 by wireless communication. The communication unit 116 may be configured to communicate with the service site server 200 by wired communication.

The control unit 118 is, for example, a general-purpose control circuit or a control circuit for particular use including a CPU. The control unit 118 controls the overall operation of the terminal device 100. The control unit 118 in the present embodiment has an information discriminating unit 1181 and an information superimposing unit 1182.

The information discriminating unit 1181 discriminates private information which can also be used as public information in the private information recorded in a private information recording unit 2022 (which can also be called a public information portion in an image) from private information which cannot be used as public information. Open public information is supposed to be general information which causes no troubles with regard to, for example, personal information, the right of portrait, or interest even when managed on, for example, a national, municipal, or corporate library or database and retrieved and used. Here, the open public information refers to information available to anyone who can access the service site server 200. The open public information may also be information whose right belongs to a person other than the user but which may be available to the user. In-house materials and hospital medical records have been converted into database forms, but are not open to an unspecified number of people, and are therefore not public even though such information is open to particular parties. The private information (public information portion) which can also be used as public information is, for example, a particular portion of private information having a part similar to public information. As described above, it can be considered that when an acquirer of an image or a sound cannot be identified, a background image portion that is irrelevant to the identification of a photographed individual or an environmental sound portion separated from collected sound is a portion which can be shared without any problems caused to anyone and which is similar to the public information. From a different angle, it is also possible to consider that anything generally included in public information is determined to be non-personal information instead of considering that anything other than faces, clothing, or voiceprints (or car license plates, or addresses or nameplates related to individuals) is public information. However, the scope in which the right of portrait, copyright, and personal information mentioned above are open does not need to be limited from patent and technical viewpoints. For example, in the case of a membership SNS, a member can access some but cannot access the other. There can be various cases of membership acquisition, and interpretation with the term "public" is possible if particular conditions are satisfied. The concept of being public may include anything that can be accessed or retrieved by a given particular group, such as anything that violates a publication, and anything that can be accessed from more than one terminal.

It is also possible to specify a part of the private information recorded in the private information recording unit 2022 as a part to be personally enjoyed or kept secret, and provide other parts as public information that can be open to the public. This secret part is not generally obtained and is therefore considered to be difficult to retrieve. That is, it is considered that private information which can also be used as public information (which can also be called a public information portion in an image) includes parts that can be retrieved from general information. Private information which cannot be used as public information is not included in general contents even if retrieval is attempted. This only requires the time for the retrieval and produces no results, and is more likely to be an obstructive matter in retrieval. For example, it is relatively easy to retrieve an image of Tokyo Tower alone from an image of Tokyo Tower alone, but it is difficult to retrieve other similar images from an image in which someone is standing in front of Tokyo Tower because the characteristics of the image of the person who is standing interfere.

That is, the information discriminating unit 1181 considers that an image includes a public information portion, and discriminates this portion that is advantageous to retrieval, thereby separating the image into the public information portion that can be retrieved by public information and a private information portion that cannot be used in public.

The information superimposing unit 1182 superimposes the open public information on the private information. For example, when the private information is an image, the information superimposing unit 1182 superimposes an image as the private information on an image as the public information.

The service site server 200 comprises, for example, a general-purpose computer. The service site server 200 has a recording unit 202, a communication unit 204, and a control unit 206. The service site server 200 according to the present embodiment also functions as a blog server and a file server by way of example.

The recording unit 202 is, for example, a hard disk, and records various data. This recording unit 202 has a public information recording unit 2021, the private information recording unit 2022, and a program recording unit 2023.

The public information recording unit 2021 is a recording unit to record the open public information. For example, when the service site server 200 is a server of a map search site, the open public information is a public map image that is available to public viewing or a scenic image attached to the public map image. The public map image according to the present embodiment can include not only a two-dimensional map image but also a three-dimensional map image. The public map image according to the present embodiment can also include chronological map images. Moreover, the scenic image according to the present embodiment can be obtained by actually photographing a particular point on the map while driving an automobile equipped with a camera capable of circumferential photography such as a camera having a fish-eye lens. A camera such as a fixed-point observation camera to photograph the whether, season, or time change in the same place can also be said to be a photography device for the above scenic image.

The private information recording unit 2022 is a recording unit to record private information. The private information to be recorded in the private information recording unit 2022 of the service site server 200 includes, for example, SNS information such as a blog, tweets, and a diary created by the user.

The program recording unit 2023 is a recording unit to record a control program for the control unit 206 of the service site server 200 to control the service site server 200.

The communication unit 204 includes a communication interface to communicate with the terminal device 100 via the network 300. The communication unit 204 communicates with the terminal device 100 via, for example, a wireless LAN circuit or a mobile telephone connection. The communication unit 204 does not always need to be configured to communicate with the terminal device 100 by wireless communication. The communication unit 204 may be configured to communicate with the terminal device 100 by wired communication.

The control unit 206 is, for example, a general-purpose control circuit or a control circuit for particular use including a CPU. The control unit 206 controls the overall operation of the service site server 200. The control unit 206 in the present embodiment has an information discriminating unit 2061 and an information superimposing unit 2062. The information discriminating unit 2061 performs the same processing as the information discriminating unit 1181, and the information superimposing unit 2062 performs the same processing as the information superimposing unit 1182. Therefore, no explanation is given here.

The operation of the communication system 1 according to the present embodiment is described below. First, an overview of the operation of the communication system 1 is described. Here, an image (private image) 400 as private information shown in FIG. 2 is recorded in the private information recording unit 1041 of the terminal device 100. The private image 400 is, for example, an image taken on a road in front of a house 402 of the user.

Figure 3:
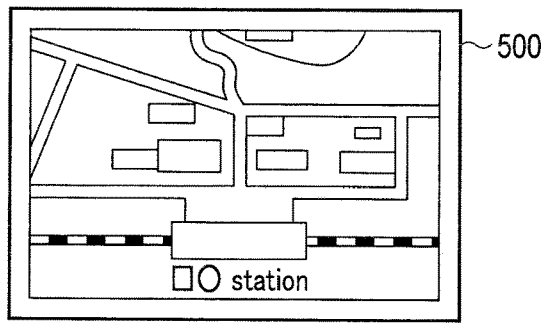
FIG. 3 is a diagram showing an example of display of a public map image on a display unit.

In the present embodiment, open public information is first acquired by the user of the terminal device 100. When an operation necessary to acquire the public map image from the service site server 200, for example, the input of a URL is performed by the user, the terminal device 100 accesses the service site server 200, and acquires the public map image requested by the user from the service site server 200. The terminal device 100 then reproduces the acquired public map image. FIG. 3 is a diagram showing an example of display of a public map image 500 on the display unit 106. In this instance, the use scene does not assume a case in which a user having a particular right acquires information from nonpublic information. This is because the use scene here assumes that an obtained content is enjoyed by everyone who has gathered. However, the scope of publication does not need to be limited from patent and technical viewpoints.

Figure 4:
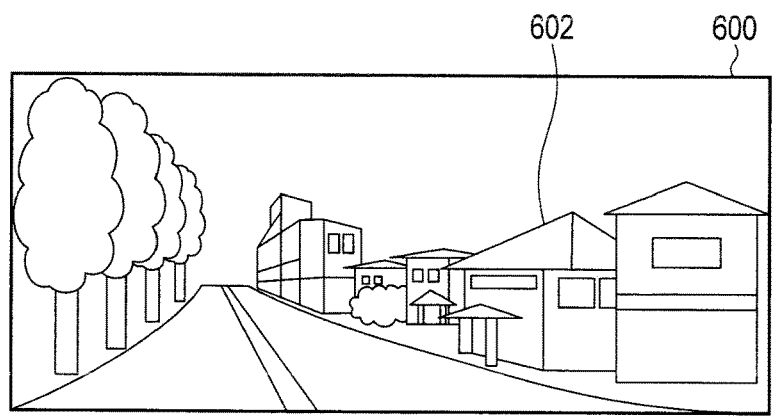
FIG. 4 is a diagram showing an example of display of a scenic image on a display unit.

When a particular position on the public map image is specified by the user in a state where the public map image is displayed, the terminal device 100 accesses the service site server 200, and acquires a scenic image corresponding to the position specified by the user from the service site server 200. The terminal device 100 then reproduces the acquired scenic image. FIG. 4 is a diagram showing an example of display of a scenic image 600 on the display unit 106.

While the scenic image 600 is being displayed, the information discriminating unit 1181 of the terminal device 100 extracts information that can be used as public information from the private information. For example, the information discriminating unit 1181 compares the scenic image with the private image, and extracts private information having similar parts. This private information having the similar parts is, for example, an image with which the same positional information as positional information associated with the scenic image is associated, or an image including a structure similar to the structure in the scenic image. For example, the private image 400 in FIG. 2 is an image including a part of the house 402 corresponding to a part of a house 602 included in the scenic image 600 in FIG. 4. Therefore, the private image 400 in FIG. 2 is extracted as private information that can be used as public information. What is important in this instance is that the public scenic image includes a large number of scenes in different conditions such as scenes of the same place on different dates and scenes of different seasons or different time zones of a day. That is, for example, a photograph of a building which does not exist anymore can be found if the public scenic image is retrieved, and an image similar to the background of the private image can be found in the images of the scene that varies by the date, season, and time zone. Therefore, if the area is limited to a particular area, it is possible to relatively rapidly find a public scenic image showing a scene similar to the scene in the background of the private image while also referring to, for example, map information regarding to this area.

Figure 5:
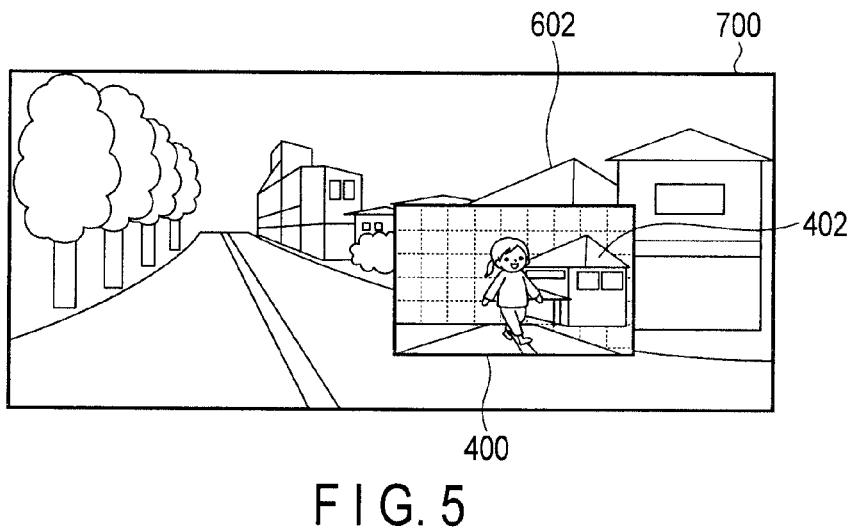
FIG. 5 is a diagram showing an example of display of a superimposed scenic image.

After the extraction of the private information that can be used as public information, the information superimposing unit 1182 performs composition to, for example, superimpose the open public information on the public information portion of the private information. The information does not necessarily have to be superimposed, and may be arranged close, which also provides similar advantageous effects. For example, the information superimposing unit 1182 superimposes the image in FIG. 2 as the private information on the part of the house 602 in the scenic image acquired from the service site server 200, and displays a superimposed scenic image on the display unit 106. FIG. 5 is a diagram showing an example of display of a superimposed scenic image 700. Here, at the time of the superimposition, the private image is preferably enlarged or reduced into a proper size to prevent unnatural superimposition on the scenic image, prevent what is shown in the image from being unclear, and prevent the background from being hidden.

Figure 6:
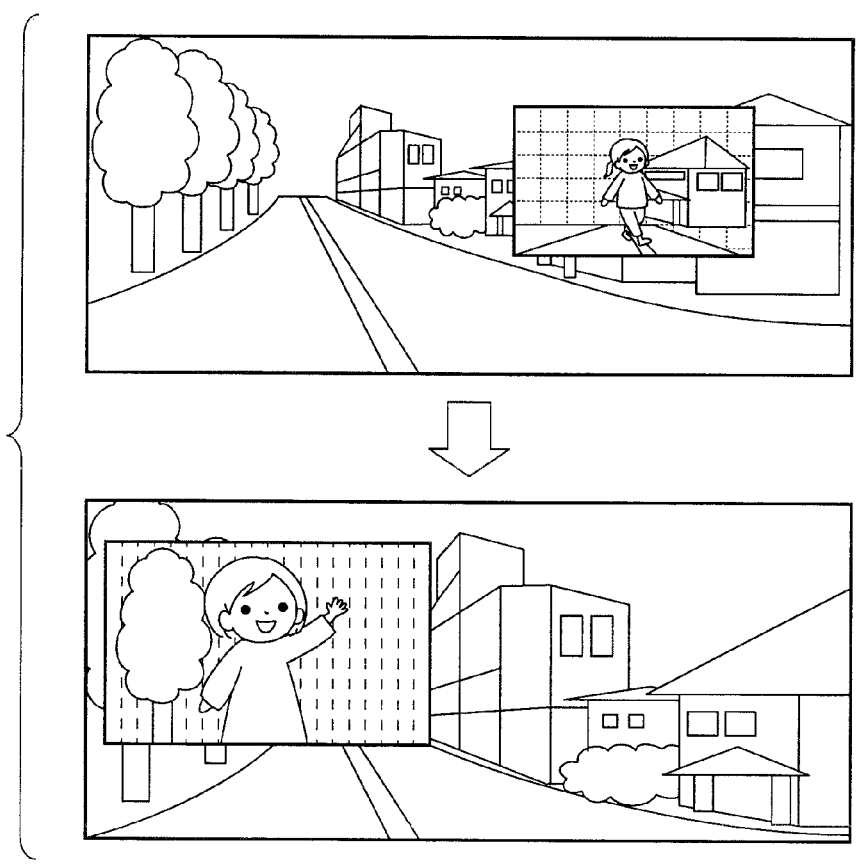
FIG. 6 is a diagram showing a display example in which superimposed scenic images are brought by a large number of users.

The superimposed scenic image 700 obtained by the information superimposing unit 1182 can be used as new public information under the instruction from the user. If such superimposed scenic images are brought by one or more users, a large number of photographs of the user which have been actually taken in accordance with the change of the scenic images and which have been broken into pieces so far are displayed in association with the scene at the time of the display of the scenic image as shown in FIG. 6. As a result, the open public information which has been merely a scenic image changes into information (which is, so to speak, compound information or an enriched hybrid image) that can be enjoyed by a large number of users. Even when the superimposed scenic image is sent to the service site server 200, it is preferable that the service site server 200 also preserves the original scenic image. Accordingly, the user can select, for example, whether to reproduce the superimposed scenic image or reproduce the normal scenic image. Even a single user can have fun on a personal or family basis, or in the case of more users, even an image that is not related to some users, is enriched as a content showing human activities, customs, and cultures which are not known only from the scene including clothing, expressions, and poses.

The operation of the communication system 1 according to the present embodiment is further described below. FIG. 7 is a flowchart showing a conceptual operation of the terminal device 100. The operation in FIG. 7 is mainly controlled by the control unit 118.

In step S101, the control unit 118 acquires public information corresponding to the operation of the operation unit 114 by the user from the service site server 200. In step S102, the control unit 118 reproduces the acquired public information.

In step S103, the information discriminating unit 1181 of the control unit 118 discriminates private information recorded in the private information recording unit 1041. That is, the information discriminating unit 1181 extracts private information having parts similar to the public information that is being reproduced at present. For example, if the public information and the private information are images, the information discriminating unit 1181 extracts private information having parts similar to the image as the public information from the private information recording unit 1041.

In step S104, the information superimposing unit 1182 of the control unit 118 superimposes the private information extracted by the information discriminating unit 1181 on the public information that is being reproduced at present and thereby generates superimposed public information (compound information).

In step S105, the control unit 118 reproduces the superimposed public information. In step S106, the control unit 118 judges whether to permit the use of the superimposed public information as new public information. For example, when the user instructs to permit the use of the superimposed public information as new public information, it is judged that the use of the superimposed public information as new public information is permitted. When it is judged in step S106 that the use of the superimposed public information as new public information is permitted, the processing proceeds to step S107. When it is judged in step S106 that the use of the superimposed public information as new public information is not permitted, the processing is finished. Thus, if, for example, an image put away in a house is uploaded onto this system, it is possible to remember forgotten places or track ancestors. If a step to confirm the user's intention is provided to manage the intention with, for example, a particular flag, the user can select whether or not to put the information in public. That is, the information may be converted into open public information with the approval of the user, or may not be opened to the public only for personal or family enjoyment.

In step S107, the control unit 118 sends the superimposed public information (compound information that is permitted to be used in public) to the service site server 200. The processing is then finished. Such processing permits the use of the superimposed public information including the private information as new public information.

Figure 8A:
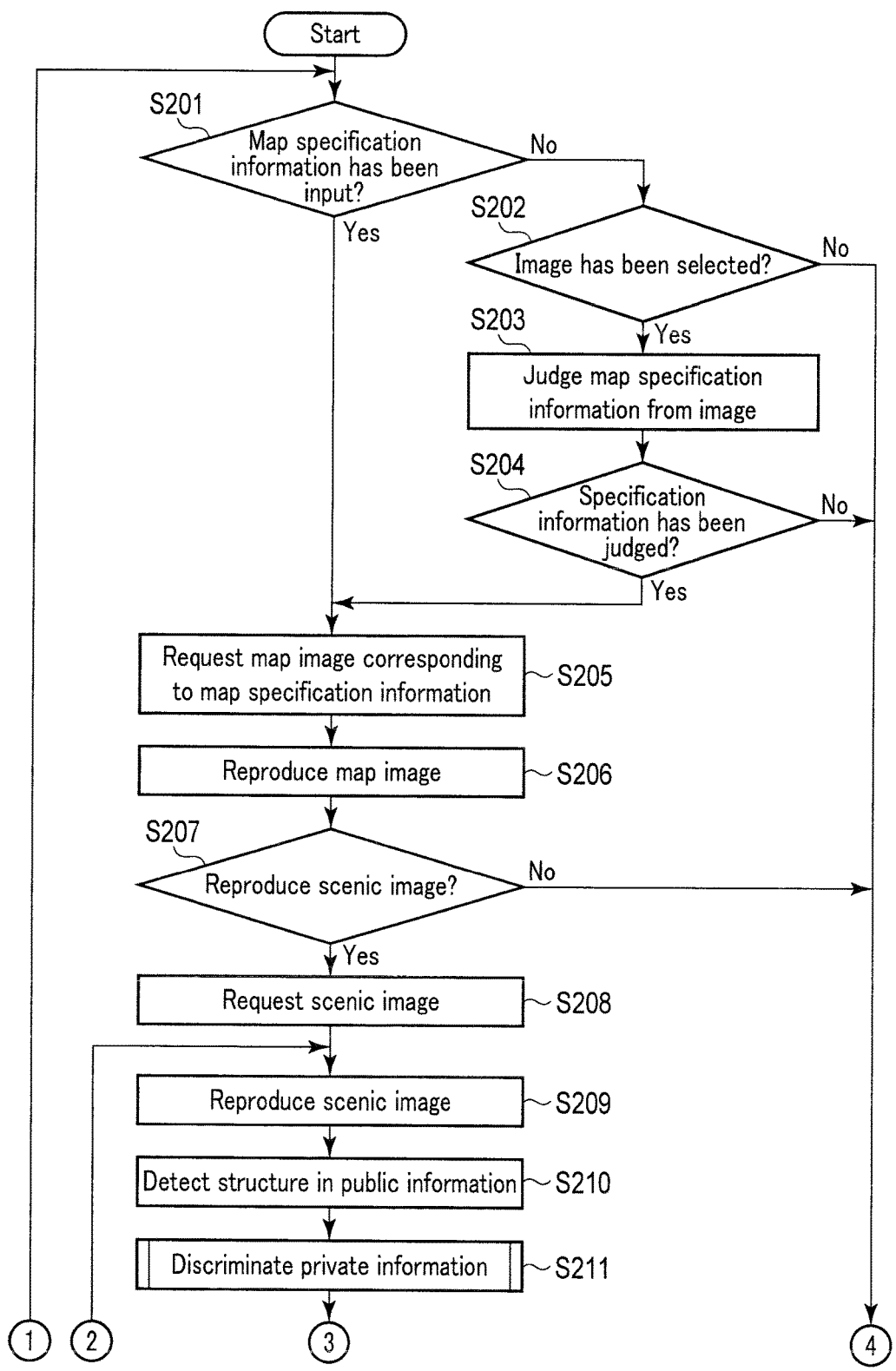
FIG. 8A is a first part of a flowchart showing the operation of the terminal device as one specific example of FIG. 7.
Figure 8B:
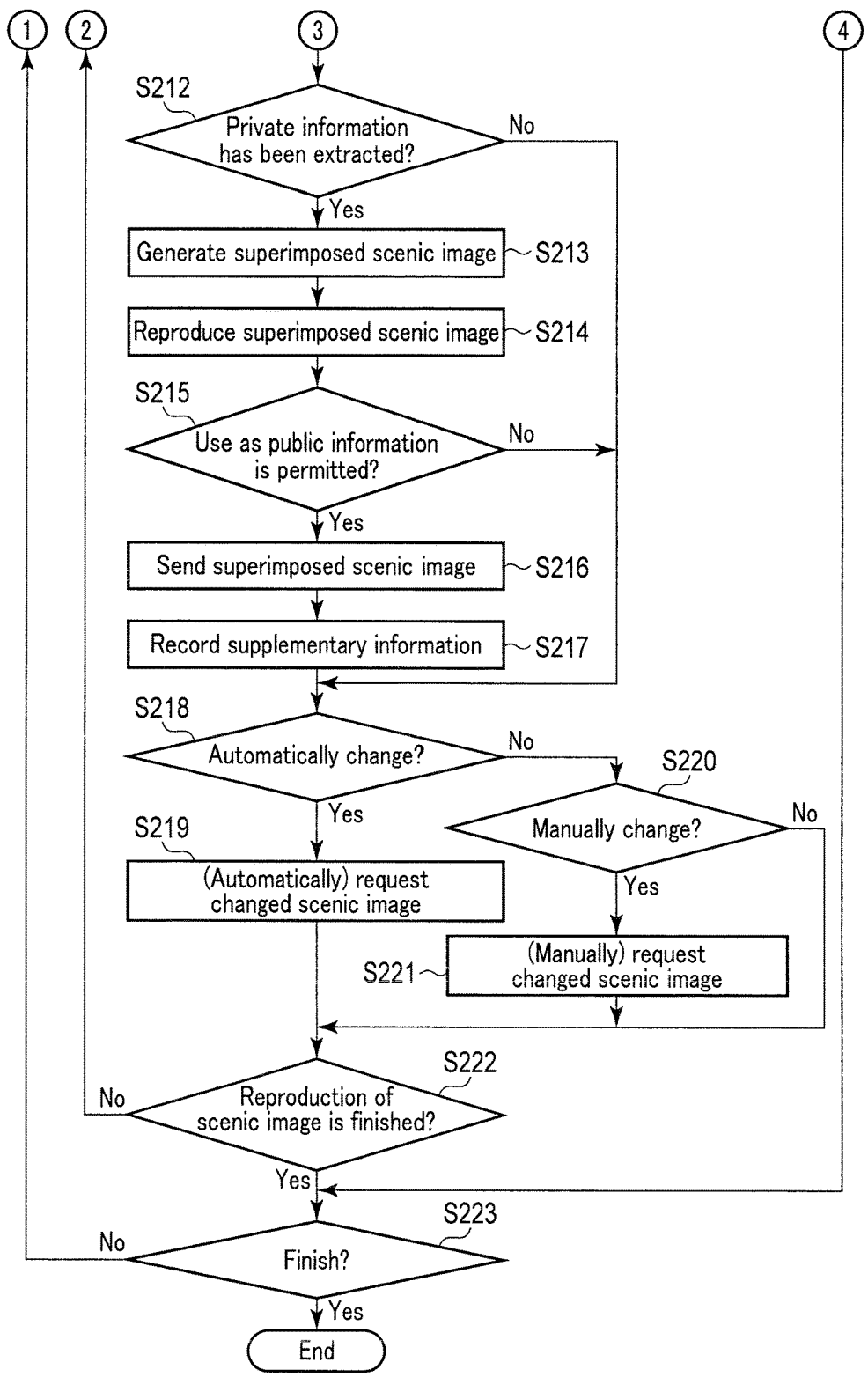
FIG. 8B is a second part of a flowchart showing the operation of the terminal device as one specific example of FIG. 7.

FIG. 8A and FIG. 8B are a flowchart showing the operation of the terminal device 100 as one specific example of FIG. 7. FIG. 8A and FIG. 8B show the example in which the terminal device 100 operates as the map display device. Therefore, the processing in FIG. 8A and FIG. 8B is started when the map display application is started. In the example of FIG. 8A and FIG. 8B, the open public information is a public map image and a scenic image attached thereto. The private information is an image personally taken by the user.

In step S201, the control unit 118 judges whether specification information regarding the public map image has been input. The specification information regarding the public map image includes, for example, positional information (latitude information and longitude information) or place-name information and date information. When it is judged in step S201 that the specification information regarding the public map image has not been input, the processing proceeds to step S202. When it is judged in step S201 that the specification information regarding the public map image has been input, the processing proceeds to step S205.

In step S202, the control unit 118 judges whether one of the images recorded in the private information recording unit 1041 has been selected by the user's operation of the operation unit 114. When it is judged in step S202 that an image has been selected, the processing proceeds to step S203. When it is judged in step S202 that no image has been selected, the processing proceeds to step S223.

In step S203, the control unit 118 judges the specification information regarding the public map image from the input image. For example, when photography position information is added to the image, the photography position information can be judged as specification information to specify the position of the public map image. Similarly, when photography date information is added to the image, the photography date information can be judged as specification information to specify the date of the public map image. In addition, it is also possible to detect specification information to specify the position or date of the public map image by an image analysis. For example, it is possible to specify an approximate photography date of the image from how old the things shown in the image are. When it is specified by the image analysis that a person is shown, it is possible to specify a photography date of the image from the characteristics (e.g. the color and shape) of the clothes worn by this person. Moreover, when it is specified by the image analysis that a characteristic building is shown on the background, it is possible to specify the photography position and photography date of the image from this building.

In step S204, the control unit 118 judges whether the specification information regarding the public map image has been acquired from the selected image. When it is judged in step S204 that the specification information regarding the public map image has been acquired from the selected image, the processing proceeds to step S205. When it is judged in step S204 that the specification information regarding the public map image has not been acquired from the selected image, the processing proceeds to step S223.

In step S205, the control unit 118 uses the communication unit 116 to request the service site server 200 to send the public map image corresponding to the specification information regarding the public map image. Accordingly, the service site server 200 sends the public map image corresponding to the specification information to the terminal device 100. In this instance, the service site server 200 sends the public map image of a predetermined range around the position specified by the specification information. The processing then proceeds to step S206.

In step S206, the control unit 118 reproduces the acquired public map image, for example, as shown in FIG. 3. In step S207, the control unit 118 judges whether to display a scenic image. For example, when a certain position on the public map image has been designated by the user, it is judged that the scenic image is to be displayed. When it is judged in step S207 that the scenic image is not to be displayed, the processing proceeds to step S223. When it is judged in step S207 that the scenic image is displayed, the processing proceeds to step S208.

In step S208, the control unit 118 requests the service site server 200 to send a scenic image corresponding to the position designated by the user. Accordingly, the service site server 200 sends the scenic image corresponding to the position designated by the user. The processing then proceeds to step S209.

In step S209, the control unit 118 reproduces the acquired scenic image, for example, as shown in FIG. 4. In step S210, the information discriminating unit 1181 of the control unit 118 detects a structure in the scenic image that is being reproduced at present. Processing of structure detection in the scenic image is described below.

A structure such as a building is mostly built perpendicularly to the ground to resist gravity. Therefore, a structure such as a building has two vertical lines as ridge lines. If different image characteristics are detected inside and outside the two vertical lines, a region surrounded by the ridge lines including the two vertical lines is estimated to be a region of a structure such as a building.

As described above, the scenic image can be obtained by actually photographing a particular point on the map while driving an automobile equipped with a camera capable of circumferential photography such as a camera having a fish-eye lens. Since a structure such as a building is mostly built to face a road, a structure shown in the scenic image mostly faces a road. Such a structure facing a road can also be estimated by detecting its ridge lines.

FIG. 9 is a diagram showing the relation between an actual structure and a structure on the scenic image in the case where a structure facing a road is photographed from, for example, a running automobile. Ridge lines of a structure 800 facing a road may have the same length but become two straight lines different in length when imaged on an imaging surface I of the image pickup device. That is, of the ridge lines of the structure 800, a ridge line 800a at a greater distance from the camera on the image is smaller in length than a ridge line 800b at a smaller distance from the camera on the image.

Here, the following relation is satisfied:

$$yb12=yb2-yb1=(Hb \cdot F/Dn)-(Hb \cdot F/Df)$$

wherein yb1 is the length of the structure 800 on the image up to the upper end of the greater-distance ridge line 800a based on a vertical position of the imaging center in the imaging surface I, yb2 is the length on the image up to the upper end of the smaller-distance ridge line 800b based on the vertical position of the imaging center in the imaging surface I, yb12 is the difference between yb1 and yb2, Hb is the height up to the upper end of the structure 800 based on the position of a lens optical axis O of the camera, W is the width of the structure 800, Df is the distance from the lens center of the camera to the greater-distance ridge line 800a, Dn is the distance from the lens center of the camera to the smaller-distance ridge line 800b, and F is the focal distance of the camera.

Here, Df=Dn+W, so that the following relation is satisfied:

$$yb12=Hb \cdot W \cdot F/(Dn+W) \cdot Dn).$$

In particular, if Dn>>W, the following relation of (Equation 1) is satisfied:

$$yb12 \approx Hb \cdot W \cdot F/Dn2 \qquad \text{(Equation 1)}.$$

Similarly, the following relation of (Equation 2) is satisfied:

$$yg12 \approx Hg \cdot W \cdot F/Dn2 \qquad \text{(Equation 2)}$$

wherein yg1 is the length of the structure 800 on the image up to the lower end of the greater-distance ridge line 800a based on the vertical position of the imaging center in the imaging surface I, yg2 is the length on the image up to the lower end of the smaller-distance ridge line 800b based on the vertical position of the imaging center in the imaging surface I, yg12 is the difference between yg1 and yg2, Hg is the height up to the lower end of the structure 800 based on the position of the lens optical axis O of the camera, W is the width of the structure 800, Of is the distance from the lens center of the camera to the greater-distance ridge line 800a, Dn is the distance from the lens center of the camera to the smaller-distance ridge line 800b, and F is the focal distance of the camera.

Here, Hb, Hg, and W are fixed values that are determined for each structure. Therefore, if the focal distance F is fixed, it is known that the differences yb12 and yg12 of the lengths of the ridge lines on the image only change according to Dn. The change of Dn can be considered to be the change of the imaging position of the scenic image. Therefore, if the imaging position of the individual scenic image is known, yb12 or yg12 is calculated from the change of the imaging position. If yb12 found from the calculation of (Equation 1) or (Equation 2) for two vertical lines extracted from the scenic image substantially corresponds to yb12 actually found from the difference of the lengths of the two vertical lines, the two vertical lines can be estimated to represent the ridge lines of the same structure.

In (Equation 1) and (Equation 2) above, it is necessary to use the change of the imaging position. Therefore, a structure in a scenic image whose imaging position is not associated cannot be detected. On the contrary, if each of the ratios between yb2 and yb1 and between yg2 and yg1 shown in (Equation 3) below is found, it is possible to estimate the ridge lines of the structure without using the change of the imaging position:

$$yb2/yb1=Df/Dn$$

$$yg2/yg1 \cdot Df/Dn \qquad \text{(Equation 3)}.$$

If Df and Dn are erased by use of (Equation 3), the following relation of (Equation 4) is obtained:

$$yb2/yb1=yg2/yg1 \qquad \text{(Equation 4)}$$

That is, if yb1, yb2, yg1, and yg2 satisfy the relation of (Equation 4) for the two vertical lines extracted from the scenic image, the two vertical lines can be estimated to represent the ridge lines of the same structure.

Figure 10A:
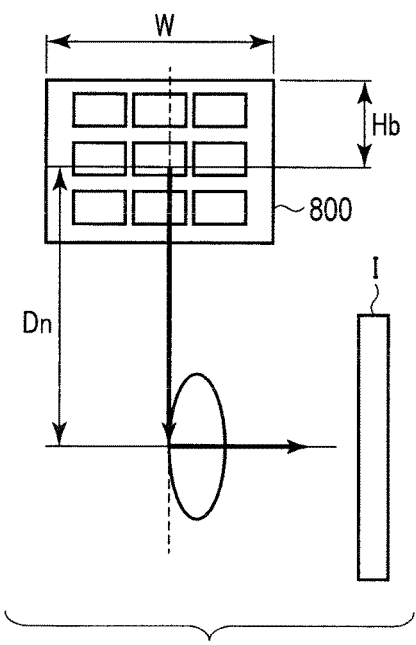
FIG. 10A is a first diagram illustrating an example of using a fish-eye lens to photograph the structure on its side.
Figure 10B:
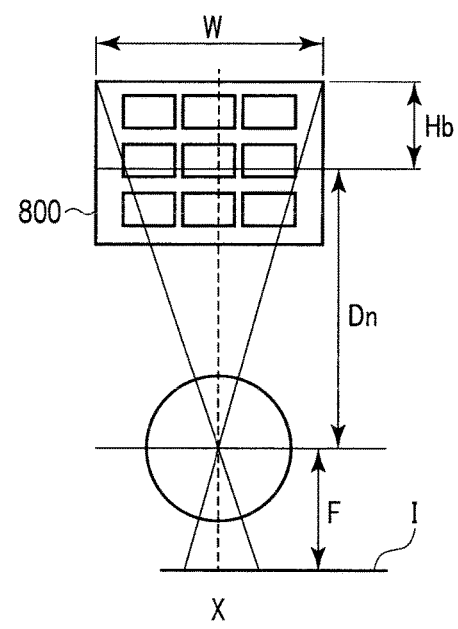
FIG. 10B is a second diagram illustrating an example of using the fish-eye lens to photograph the structure on its side.

Furthermore, the fish-eye lens images the figure of the subject at an angle of view of the circumference around the fish-eye lens on the image pickup device. Thus, a structure which is built to face a road but which is located beside the camera as shown in FIG. 10A is photographed as in the case in which the structure is photographed in front of the camera as shown in FIG. 10B. Such a scenic image can be handled as a scenic image obtained by photographing the structure in its front. Ridge lines of the structure in this case can be easily estimated.

A specific example of structure detection processing is described below. FIG. 11 is a flowchart showing the specific example of the structure detection processing. In step S301, the vertical direction of the scenic image is determined. There are several possible ways to determine the vertical direction of the scenic image. For example, one possible way is to determine the vertical direction of the image from, for example, the direction of the camera when the scenic image is taken. In this case, the information discriminating unit 1181 determines the vertical direction of the scenic image by reading information regarding the vertical direction of the image attached to the scenic image. The information discriminating unit 1181 can also determine the vertical direction of the scenic image by detecting various targets such as a road (ground) and the sky that serve as the bases for determining the vertical direction of the image. Otherwise, the vertical direction of the image is determined by use of various methods that have heretofore been known.

In step S302, the information discriminating unit 1181 extracts the vertical lines in the scenic image as candidates of the ridge lines of the structure. The vertical lines are extracted by use of an edge extraction technique for, for example, an edge extraction filter. The vertical lines are not exclusively extracted by the edge extraction technique. The vertical lines are detected by use of various methods that have heretofore been known.

In step S303, the information discriminating unit 1181 judges whether the vertical lines have been extracted. When it is judged in step S303 that the vertical lines have been extracted, the processing proceeds to step S304. When it is judged in step S303 that the vertical lines have not been extracted, the processing proceeds to step S308. In this case, it is considered that no structure has been detected.

In step S304, the information discriminating unit 1181 selects two close vertical lines among the extracted vertical lines.

In step S305, the information discriminating unit 1181 judges whether the image characteristics between the selected two vertical lines are different from the image characteristics outside the vertical lines. Here, the image characteristics mean, for example, a luminance distribution and a color distribution. When it is judged in step S305 that the image characteristics between the two vertical lines are different from the image characteristics outside the vertical lines, the processing proceeds to step S306. When it is judged in step S305 that the image characteristics between the two vertical lines are not different from the image characteristics outside the vertical lines, the processing proceeds to step S308. In this case, it is considered that no structure has been detected.

In step S306, the information discriminating unit 1181 judges whether the relation of (Equation 4) is satisfied with regard to the selected two vertical lines. When it is judged in step S306 that the relation of (Equation 4) is satisfied with regard to the two vertical lines, the processing proceeds to step S307. When it is judged in step S306 that the relation of (Equation 4) is not satisfied with regard to the two vertical lines, the processing proceeds to step S308. In this case, it is considered that no structure has been detected.

In step S307, the information discriminating unit 1181 determines the selected two vertical lines to be the vertical lines of the structure. The information discriminating unit 1181 then determines an image region between these vertical lines to be the image region of the structure and then stores positional information for this image region in an unshown memory. The processing then proceeds to step S308.

In step S308, the information discriminating unit 1181 judges whether to finish the structure detection processing. That is, when it is judged that the structure has been detected for all pairs of vertical lines, the structure detection processing is judged to be finished. When it is judged in step S308 that the structure detection processing is not to be finished, the processing returns to step S304. In this case, the information discriminating unit 1181 selects another pair of vertical lines to continue the structure detection. When it is judged in step S308 that the structure detection processing is to be finished, the processing in FIG. 11 is finished.

In the above explanation, the structure is supposed to be a thing surrounded by straight lines in the image, for example, a building or a house. In contrast, the structure in the present embodiment may be considered to be the overall background other than a main subject such as a person. In the structure detection processing in this case, it is possible to detect a main subject such as a person and determine a part other than the detected main subject to be the structure.

Figure 12:
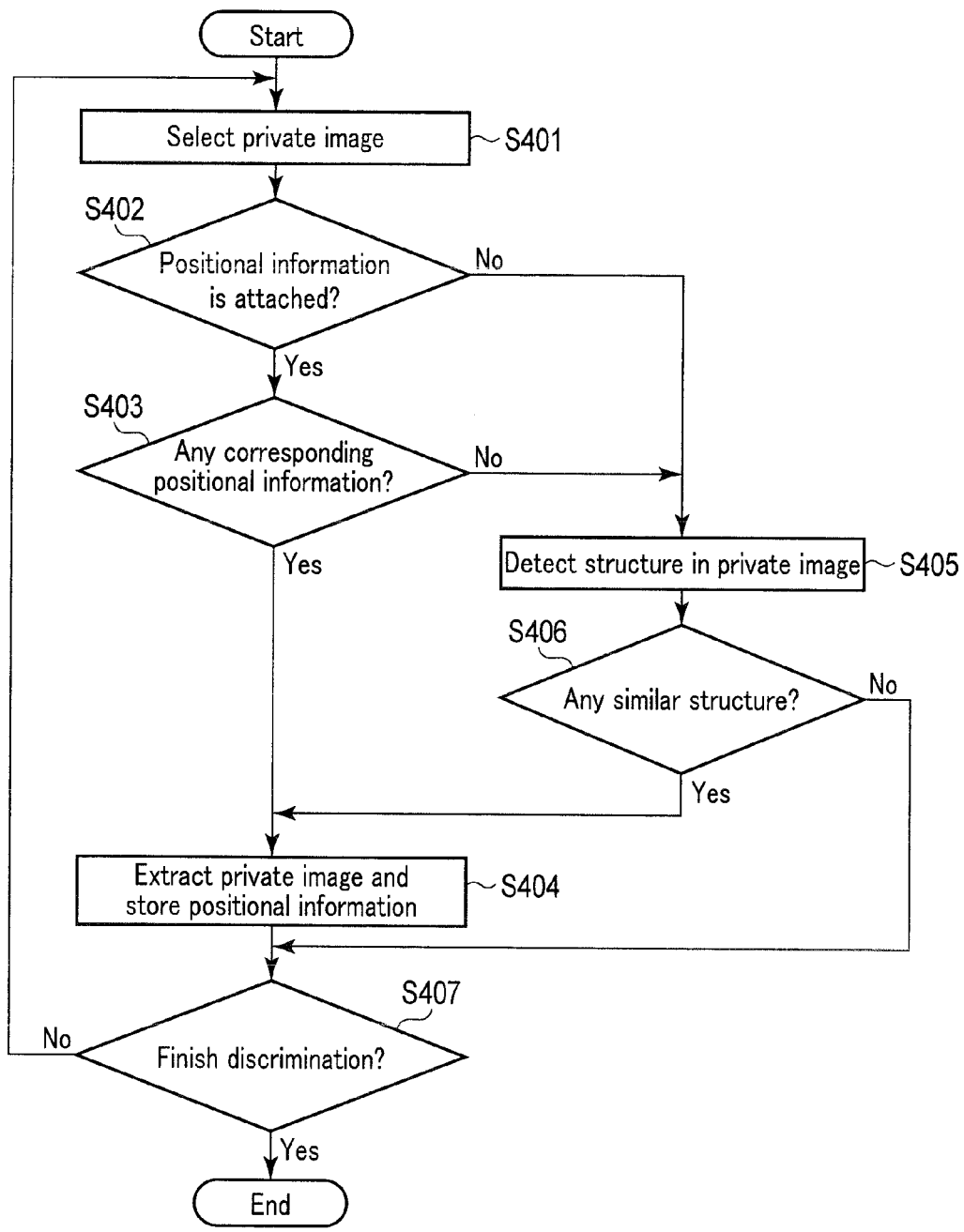
FIG. 12 is a flowchart showing information discriminating processing according to the first embodiment.

Back to the explanation of FIG. 8A and FIG. 8B here, after the structure detection processing for the scenic image, the information discriminating unit 1181 discriminates a private image in step S211. The information discriminating processing is described below. FIG. 12 is a flowchart showing the information discriminating processing according to the first embodiment.

In step S401, the information discriminating unit 1181 selects one of the private images recorded in the private information recording unit 1041. For example, the information discriminating unit 1181 selects a private image whose associated time is the latest.

In step S402, the information discriminating unit 1181 judges whether positional information is attached to the private image that is being selected. When it is judged in step S402 that the positional information is attached, the processing proceeds to step S403. When it is judged in step S402 that the positional information is not attached, the processing proceeds to step S405.

In step S403, the information discriminating unit 1181 judges whether the positional information attached to the private image that is being selected indicates positional information for a particular structure in the scenic image. This judgement is made by comparing the positional information in the scenic image that is being reproduced at present with the positional information attached to the private image that is being selected. That is, when the difference between the positional information in the scenic image and the positional information attached to the private image that is being selected is less than or equal to a predetermined value, it is judged that the positional information attached to the private image that is being selected indicates the positional information in the scenic image. When it is judged in step S403 that the positional information attached to the private image that is being selected indicates the positional information in the scenic image, the processing proceeds to step S404. When it is judged in step S403 that the positional information attached to the private image that is being selected does not indicate the positional information in the scenic image, the processing proceeds to step S405.

In step S404, the information discriminating unit 1181 extracts the private image that is being selected as a private image that can also be used as public information. Further, the information discriminating unit 1181 stores the positional information in the scenic image that has been judged to correspond in the unshown memory. The processing then proceeds to step S407. Attention is paid to the right of portrait and personal information as to whether the image can be used as public information, so that an image in which the face is not visible in face detection or in which particular characters in, for example, addresses or nameplates are unreadable in character detection may be selected, the user's intention may be confirmed, or a part substantially corresponding to open public information such as the scenic image may be used. For example, if a place where snow is accumulated is not found in the scene of the open public information but is found in the background of a personally taken photograph, this can be said to be decrypted and enriched information in which the accumulation of snow can be realized, and is therefore an important content. If the open public information is not decrypted, the image can end up as a mere snow scene photographed in an unknown place. However, if the image is combined with other information, the image can be an important target of enjoyment even if a person who appears is unknown.

In step S405, the information discriminating unit 1181 performs the structure detection processing in the private image. In the structure detection processing in the private image as well as in the structure detection processing in the scenic image, two vertical lines forming the ridge lines of the structure are detected, and it can thereby be estimated that the structure is present in these vertical lines. In the case of the private image, the structure is often photographed from the front as shown in FIG. 2. Therefore, the structure can be detected in the same way of thinking as in FIG. 10B. Naturally, the structure detection processing in the public image described in FIG. 11 may be used.

In step S406, the information discriminating unit 1181 judges whether there is any structure similar to the scenic image in the structure detected from the private image. A similar structure is judged, for example, by matching the ridge lines of the structure in the scenic image and the ridge lines of the structure in the private image. However, the structure facing a road is often photographed in the scenic image, and the structure is often photographed from the front in the private image. Therefore, the differences of, for example, the photography direction, the photography distance, and the photography angle of view are preferably taken into account to correct, for example, the distance between the ridge lines at the time of matching. When it is judged in step S406 that there is a similar structure, the processing proceeds to step S404. In this case, the information discriminating unit 1181 extracts a private image that is being selected as a private image that can also be used as public information. Further, the information discriminating unit 1181 stores, in the unshown memory, the positional information regarding the structure in the scenic image which has been judged to be similar. The processing then proceeds to step S407.

In step S407, the information discriminating unit 1181 judges whether to finish the information discriminating processing. That is, when it is judged that information has been discriminated for all the private images, it is judged that the information discriminating processing is to be finished. When it is judged in step S407 that the information discriminating processing is not to be finished, the processing returns to step S401. In this case, the information discriminating unit 1181 selects another private image to continue the structure detection. When it is judged in step S407 that the information discriminating processing is to be finished, the processing in FIG. 12 is finished.

Back to the explanation of FIG. 8A and FIG. 8B here, after the information discriminating processing, the control unit 118 judges in step S212 whether there is any private image extracted by the information discriminating unit 1181. When it is judged in step S212 that there is a private image extracted by the information discriminating unit 1181, the processing proceeds to step S213. When it is judged in step S212 that there is no private image extracted by the information discriminating unit 1181, the processing proceeds to step S218.

In step S213, the information superimposing unit 1182 of the control unit 118 superimposes the private image extracted in the information discriminating processing on the scenic image and thereby generates superimposed scenic image. The processing then proceeds to step S214. The superimposition position of the private image is the position stored in step S404 of the information discriminating processing. At the time of the superimposition, it is preferable to trim and enlarge or reduce the private image in accordance with the size of the scenic image.

In step S214, the control unit 118 reproduces the superimposed scenic image generated in the information superimposing unit 1182, for example, as shown in FIG. 5. In step S215, the control unit 118 judges whether to permit the use of the superimposed scenic image as new public information. For example, the control unit 118 asks the user, for example, by display whether the use of the superimposed scenic image as new (open) public information may be permitted. In response to this asking, the user issues an instruction as to whether the superimposed scenic image may be used as new (open) public information. Under this instruction, the control unit 118 makes a judgement in step S215. When it is judged in step S215 that the use of the superimposed scenic image as new (open) public information is permitted, the processing proceeds to step S216. When it is judged in step S215 that the use of the superimposed scenic image as new (open) public information is not permitted, the processing proceeds to step S218.

In step S216, the control unit 118 sends the superimposed scenic image generated in the information superimposing unit 1182 to the service site server 200 by the communication unit 116. Consequently, the superimposed scenic image can be used as new (open) public information in the service site server 200.

In step S217, the control unit 118 records supplementary information regarding the superimposed scenic image in the supplementary information recording unit 1042. The supplementary information includes, for example, an address (URL) on the network 300 where the scenic image used to generate the superimposed scenic image is recorded, information regarding the superimposition position of the private image in the superimposed scenic image, and information regarding the size of the private image. If this supplementary information is recorded, the superimposed scenic image can be easily generated from the scenic image in the terminal device 100. In the example according to the present embodiment, the processing in step S217 is performed when it is judged that the use of the superimposed scenic image as new (open) public information is permitted. On the contrary, the processing in step S217 may also be performed when it is judged that the use of the superimposed scenic image as new (open) public information is not permitted. Such a configuration enables the user of the terminal device 100 to privately enjoy the superimposed scenic image. In this case, the scenic image to be composed with the private image may also be recorded in the private information recording unit 1041.

In step S218, the control unit 118 judges whether to automatically change the scenic image. Whether to automatically change the scenic image is set by the user of the terminal device 100. When it is judged in step S218 that the scenic image is automatically changed, the processing proceeds to step S219. When it is judged in step S218 that the scenic image is not automatically changed, the processing proceeds to step S220.

In step S219, the control unit 118 requests the service site server 200 to send a necessary scenic image in accordance with the setting of the automatic change. The processing then proceeds to step S222. For example, the control unit 118 requests, at every predetermined time, the sending of a scenic image at a position shifted forward a predetermined distance. Accordingly, a scenic image located forward a predetermined distance is reproduced at every predetermined time in sequence.

In step S220, the control unit 118 judges whether to manually change the scenic image. Whether to manually change the scenic image is judged in accordance with whether an operation to change the scenic image has been performed by the user of the terminal device 100. When it is judged in step S220 that the scenic image is manually changed, the processing proceeds to step S221. In step S221, the control unit 118 requests the service site server 200 to send a necessary scenic image in accordance with the user operation. The processing then proceeds to step S222. For example, when instructed by the user operation to reproduce a scenic image located forward a predetermined distance, the control unit 118 requests the sending of this image. Accordingly, a scenic image corresponding to the user operation is reproduced. When it is judged in step S220 that the scenic image is not manually changed, the processing proceeds to step S222.

In step S222, the control unit 118 judges whether to finish the reproduction of the scenic image. Whether to finish the reproduction of the scenic image is judged in accordance with whether an operation to finish the reproduction of the scenic image has been performed by the user of the terminal device 100. When it is judged in step S222 that the reproduction of the scenic image is not to be finished, the processing returns to step S209. In this case, the reproduction of the scenic image (or the superimposed scenic image) is continued. When it is judged in step S222 that the reproduction of the scenic image is to be finished, the processing proceeds to step S223.

In step S223, the control unit 118 judges whether to finish the reproduction of the map image. For example, when an instruction to finish the map display application is issued, it is judged that the reproduction of the map image is to be finished. When it is judged in step S223 that the reproduction of the map image is not to be finished, the processing returns to step S201. In this case, the reproduction of the map image is continued. When it is judged in step S223 that the reproduction of the map image is to be finished, the processing in FIG. 8A and FIG. 8B is finished.

As described above, in the present embodiment, private information that can also be used in public is extracted from private information owned by the user for personal use. It is thus possible to link the private information with the open public information, and change the public information that can be viewed by a large number of people into information that can be more enjoyed. Private information can include old information even the possession of which has been forgotten by the user. The technique according to the present embodiment is also advantageous to the reuse of such private information.

In the present embodiment, whether to permit the use of the superimposed scenic image as new (open) public information is decided by the user. Therefore, private information which the user does not like to show in public is not opened to the public. On the other hand, generated superimposed public information can be personally enjoyed by the user.

Here, in the embodiment described above, the information discriminating processing is performed in the terminal device 100. The information discriminating processing may be performed in the service site server 200. The processing to superimpose the private image as the private information on the scenic image as the public information may also be performed in the service site server 200. When the information discriminating processing is performed in the service site server 200, the private information used in the information discriminating processing is not exclusively the private image acquired in the terminal device 100. For example, information discriminating processing similar to the information discriminating processing described above in which information regarding a blog recorded in the private information recording unit 2022 is the private information may be performed.

Second Embodiment

Now, a second embodiment of the present invention is described. In the first embodiment, private information having parts (public information portion) similar to the public information is extracted as private information that can be used as public information. Protection of privacy is dependent on the decision by the user. The second embodiment is an example that further takes the protection of privacy into consideration. The same parts in the second embodiment as those in the first embodiment are not described. That is, the configuration of the communication system 1 is not described because the configuration in FIG. 1 is applied as it is.

FIG. 13 is a flowchart showing the operation of the terminal device 100 as one specific example according to the second embodiment. In contrast to FIG. 8A and FIG. 8B, FIG. 13 shows an example of the terminal device 100 operating as a camera. Therefore, the processing in FIG. 13 is started when the camera application is started. In the example of FIG. 13, the open public information includes a public map image and an accompanying scenic image. The private information is an image personally photographed by the user.

In step S501, the control unit 118 judges whether the operation mode is a photography mode. The camera application according to the present embodiment is provided with two operation modes: the photography mode and a reproduction mode. The photography mode is the operation mode to take a private image. The reproduction mode is the operation mode to reproduce the private image taken in the photography mode. The operation mode is set by the user operation. When it is judged in step S501 that the operation mode is the photography mode, the processing proceeds to step S502. When it is judged in step S501 that the operation mode is the reproduction mode, the processing proceeds to step S508.

In step S502, the control unit 118 controls the information acquiring unit 102 having a function as an imaging unit to start the imaging of the subject. An image obtained in the information acquiring unit 102 is live-view-displayed on the display unit 106.

In step S503, the control unit 118 estimates a main subject in the image obtained in the information acquiring unit 102. The main subject is, for example, a human face. A known method such as pattern matching can be applied as a method of detecting the human face. The main subject may otherwise be, for example, a subject in the center of a screen.

In step S504, the control unit 118 controls the information acquiring unit 102 to perform focal adjustment and exposure adjustment for the main subject.

In step S505, the control unit 118 judges whether to perform a photography operation. For example, when an instruction to perform photography is issued by the user's operation of the operation unit 114, it is judged that the photography operation is to be performed. When it is judged in step S505 that the photography operation is to be performed, the processing proceeds to step S506. When it is judged in step S505 that the photography operation is not to be performed, the processing returns to step S501.

In step S506, the control unit 118 performs the photography operation. That is, the control unit 118 acquires an image of the main subject which has controlled the information acquiring unit 102. The control unit 118 then records the acquired image in the private information recording unit 1041 as a private image.

Figure 14:
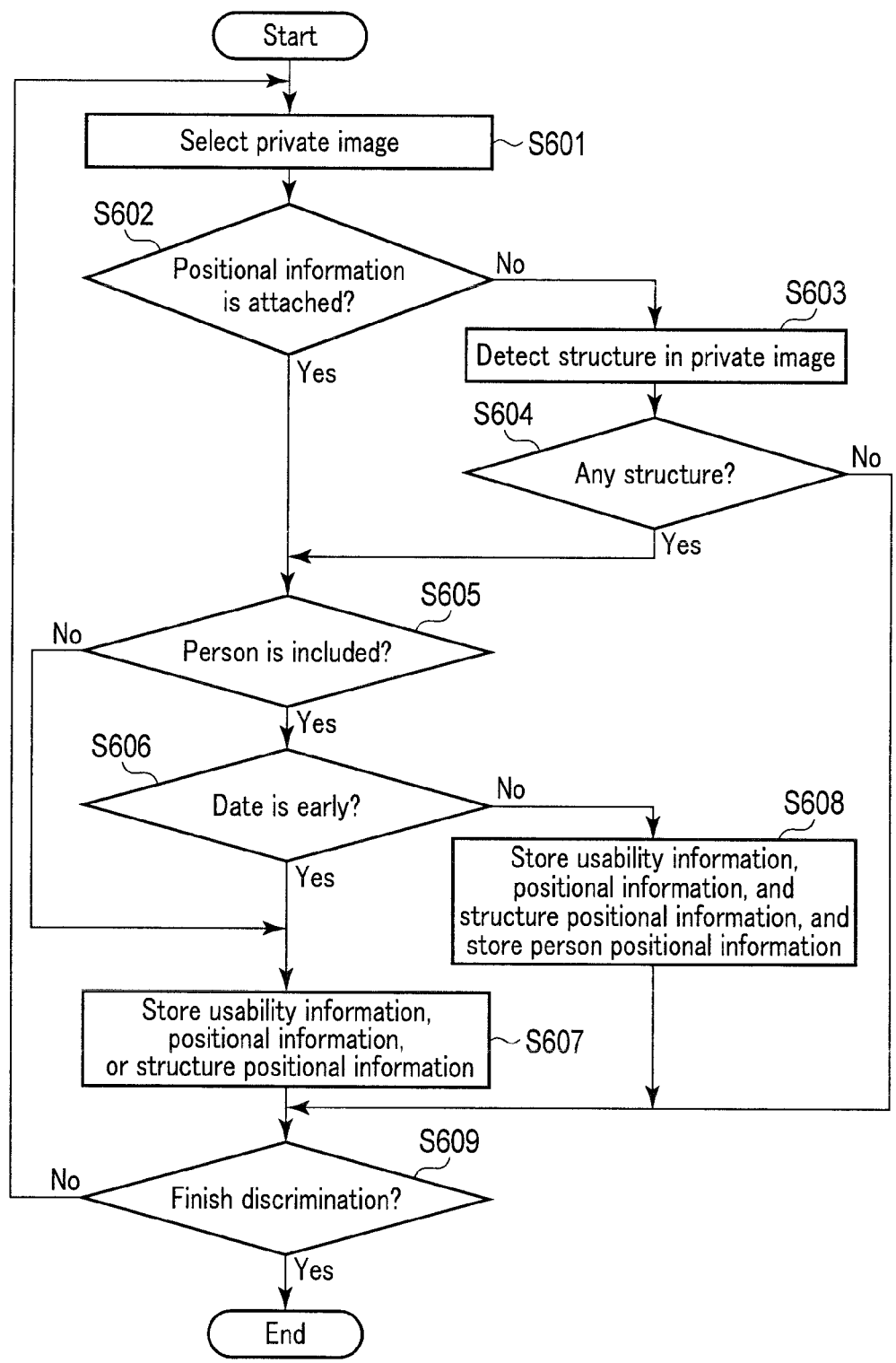
FIG. 14 is a flowchart showing information discriminating processing according to the second embodiment.

In step S507, the information discriminating unit 1181 of the control unit 118 discriminates information in the private image recorded in the private information recording unit 1041. The processing then returns to step S501. The information discriminating processing is described below. FIG. 14 is a flowchart showing the information discriminating processing according to the second embodiment.

In step S601, the information discriminating unit 1181 selects one of the private images recorded in the private information recording unit 1041.

In step S602, the information discriminating unit 1181 judges whether photography position information is attached to the private image that is being selected. When it is judged in step S602 that the photography position information is not attached, the processing proceeds to step S603.

When it is judged in step S602 that the photography position information is attached, the processing proceeds to step S605.

In step S603, the information discriminating unit 1181 performs the structure detection processing in the private image. The processing then proceeds to step S604. The technique described in the first embodiment can be used in the structure detection processing. Explanation is omitted here.

In step S604, the information discriminating unit 1181 judges whether a structure has been detected from the private image. When it is judged in step S604 that a structure has been detected from the private image, the processing proceeds to step S605. When it is judged in step S604 that no structure has been detected from the private image, the processing proceeds to step S609.

In step S605, the information discriminating unit 1181 judges whether a person is included in the private image that is being selected. The part of the person in the private image is a private part which is likely to be personal information, and is therefore basically prevented from being used as public information. When it is judged in step S605 that a person is included in the private image that is being selected, the processing proceeds to step S606. When it is judged in step S605 that no person is included in the private image that is being selected, the processing proceeds to step S607.

In step S606, the information discriminating unit 1181 judges whether the photography date of the private image that is being selected is earlier than a predetermined date (e.g. Year 10). That is, an image which includes a person but which is certain years old is considered to be an image that may be opened to the public. Therefore, the use of an image which includes a person but which has an old photography date as public information is permitted. When it is judged in step S606 that the photography date of the private image that is being selected is earlier than the predetermined date, the processing proceeds to step S607. When it is judged in step S606 that the photography date of the private image that is being selected is not earlier than the predetermined date, the processing proceeds to step S608. This predetermined date may correspond to the copyright or may be an order of several years if personal identification is impossible.

In step S607, the information discriminating unit 1181 attaches usability information to the private image that is being selected to indicate that this private image can also be used as public information. Whether the private image can be used, that is, whether the private image becomes public information is decided by a waiver by the right holder or by the intention to approve publication, and can therefore be interpreted in various ways. However, the private image can be classified by whether this "usability information" is attached. The information discriminating unit 1181 stores the photography position information or the positional information regarding the structure in the unshown memory as positional information regarding the public portion of the private image. The processing then proceeds to step S609. In step S608, the information discriminating unit 1181 attaches usability information to the private image that is being selected to indicate that this private image can also be used as public information. The information discriminating unit 1181 stores the photography position information or the positional information regarding the structure in the unshown memory as positional information regarding the public portion of the private image. Further, the information discriminating unit 1181 stores the positional information regarding the person in the unshown memory as positional information regarding the private portion of the private image. The processing then proceeds to step S609.

In step S609, the information discriminating unit 1181 judges whether to finish the information discriminating processing. That is, when it is judged that information has been discriminated for all the private images, it is judged that the information discriminating processing is to be finished. When it is judged in step S609 that the information discriminating processing is not to be finished, the processing returns to step S601. In this case, the information discriminating unit 1181 selects another private image to continue the structure detection. When it is judged in step S609 that the information discriminating processing is to be finished, the processing in FIG. 14 is finished.

Back to the explanation of FIG. 13 here, the control unit 118 displays, on the display unit 106, thumbnails of private images recorded in the private information recording unit 1041 in step S508. In step S509, the control unit 118 judges whether a private image has been selected by the user's operation of the operation unit 114. When it is judged in step S509 that a private image has been selected, the processing proceeds to step S510. When it is judged in step S509 that no private image has been selected, the processing proceeds to step S521.

In step S510, the control unit 118 reproduces the selected private image on the display unit 106. In step S511, the control unit 118 judges whether the usability information is attached to the private image that is being selected. When it is judged in step S511 that the usability information is attached to the private image that is being selected, the processing proceeds to step S512. When it is judged in step S511 that the usability information is not attached to the private image that is being selected, the processing proceeds to step S520.

In step S512, the control unit 118 requests the service site server 200 to send a scenic image related to the private image that is being selected. In this instance, the control unit 118 sends the photography position information or the positional information regarding the structure related to the private image that is being selected to the service site server 200. Accordingly, the information discriminating unit 2061 of the control unit 206 of the service site server 200 extracts, from the (open) public information recording unit 2021, a scenic image having a structure similar to the structure in the scenic image taken at the position corresponding to the photography position of the private image or in the private image, as in the processing in FIG. 12. The control unit 206 then sends the extracted scenic image to the terminal device 100. The processing then proceeds to step S513.

In step S513, the control unit 118 judges whether a person position is related to the private image that is being selected. When it is judged in step S513 that the person position is related to the private image that is being selected, the processing proceeds to step S514. When it is judged in step S513 that the person position is not related to the private image that is being selected, the processing proceeds to step S515.

In step S514, the information superimposing unit 1182 of the control unit 118 processes the part of the person in the private image that is being selected. The processing is performed as needed in consideration of the right of portrait and others. The processing reduces the visibility of the person part, and includes blurring processing and black-out processing. This processing may be performed for the face of the person alone. After the processing, the information superimposing unit 1182 superimposes the processed private information on the scenic image acquired in step S512 to generate a superimposed scenic image. The processing then proceeds to step S516. The superimposition position of the private image is the position related to the private image. At the time of the superimposition, it is preferable to trim and enlarge or reduce the private image in accordance with the size of the scenic image.

In step S515, the information superimposing unit 1182 superimposes the unprocessed private image on the scenic image acquired in step S512 to generate a superimposed scenic image. The processing then proceeds to step S516. The superimposition position of the private image is the position related to the private image. At the time of the superimposition, it is preferable to trim and enlarge or reduce the private image in accordance with the size of the scenic image. In this instance, more than one private image may correspond to the same position in the scenic image (e.g. a graduation ceremony photograph at the gate of an elementary school), in which case importance is attached to sense of oneness with the scene, so that the common scenic image serving as a mounting is compared with a scenic part of the private image, and the naturalness of composition, the correspondence degree of edges, hues, and brightness are taken into consideration to select an image providing a satisfactory sense of continuity of the above factors, or, for example, the oldest or newest image or an attractive image may be selected and displayed. Naturally, more than one image may be laid over each other or reduced to display thumbnails of the images. Alternatively, an image may be selected according to four seasons to suit to the scene, or the date of acquisition, the time including morning, day, or night, and weather may be additionally selected.

Figure 15:
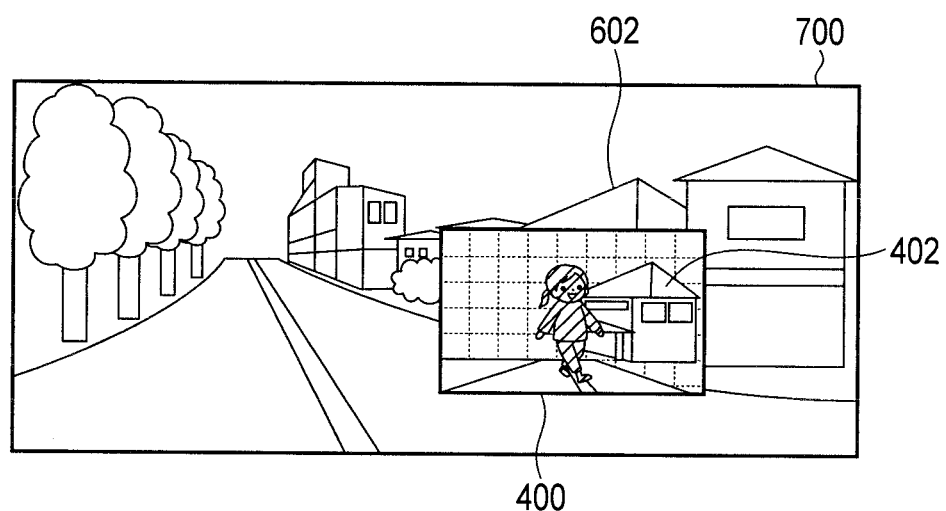
FIG. 15 is a diagram showing an example of display of a superimposed scenic image according to the second embodiment.

In step S516, the control unit 118 reproduces the superimposed scenic image generated in the information superimposing unit 1182, for example, as shown in FIG. 15. When the image is processed as shown in FIG. 15, the visibility of the person part is reduced. Thus, the private part is not opened to the public, and privacy is protected. In step S517, the control unit 118 judges whether to permit the use of the superimposed scenic image as new open public information. When it is judged in step S517 that the use of the superimposed scenic image as new open public information is permitted, the processing proceeds to step S518. When it is judged in step S517 that the use of the superimposed scenic image as new open public information is not permitted, the processing proceeds to step S520.

In step S518, the control unit 118 sends the superimposed scenic image generated in the information superimposing unit 1182 to the service site server 200 by the communication unit 116. Consequently, the superimposed scenic image can be used as new open public information in the service site server 200.

In step S519, the control unit 118 records supplementary information regarding the superimposed scenic image in the supplementary information recording unit 1042. The supplementary information includes, for example, an address (URL) where the scenic image used to generate the superimposed scenic image is recorded, information regarding the superimposition position of the private image in the superimposed scenic image, and information regarding the size of the private image. If this supplementary information is recorded, the superimposed scenic image can be easily generated from the scenic image in the terminal device 100. In the example according to the present embodiment, the processing in step S519 is performed when it is judged that the use of the superimposed scenic image as new open public information is permitted. On the contrary, the processing in step S519 may also be performed when it is judged that the use of the superimposed scenic image as new open public information is not permitted. Such a configuration enables the user of the terminal device 100 to privately enjoy the superimposed scenic image. In this case, the scenic image to be composed with the private image may also be recorded in the private information recording unit 1041.

In step S520, the control unit 118 judges whether to change the private image that is being reproduced. The user of the terminal device 100 sets whether to change the private image by the operation of the operation unit 114. When it is judged in step S520 that the private image is changed, the processing returns to step S510. In this case, the changed private image is reproduced. When it is judged in step S520 that the private image is not changed, the processing proceeds to step S521.

In step S521, the control unit 118 judges whether to finish the reproduction mode. Whether to finish the reproduction mode is judged in accordance with whether an operation to finish the reproduction mode has been performed by the user of the terminal device 100. When it is judged in step S521 that the reproduction mode is not to be finished, the processing returns to step S510. In this case, the reproduction of the private image (or the superimposed scenic image) is continued for a moment in accordance with the visibility. At the time of the return to step S510, the mounting-like background image as the open public information is sequentially changed. If this background image is displayed in such a manner as to go on the road, it is possible to view with the feeling of walking or driving in an old townscape. This leads to more real and enriched experience during viewing. That is, the public portions can also be said to be frames that constitute a series of image groups (CG is also possible) obtained by changing the photography position, for example, by moving image photography or continuous shooting on a vehicle or moving image photography or continuous shooting on foot. The private image may be blinkingly displayed or may be composed and superimposed to disappear so that its size changes in accordance with the background. When it is judged in step S521 that the reproduction mode is to be finished, the processing returns to step S501.

As described above, in the present embodiment, it is possible to generate superimposed public information (compound information) that further takes the protection of privacy into consideration, in addition to the advantageous effects similar to those in the first embodiment.

The technique according to the second embodiment shown in the example is applied to the camera application. However, the technique according to the second embodiment is also applied to the map display application similar to that according to the first embodiment. Contrarily, the technique according to the first embodiment is also applied to the camera application similar to that according to the second embodiment.

While the present invention has been described above in connection with the embodiments, it should be understood that the present invention is not limited to the embodiments described above and various modifications and applications can be made within the spirit of the present invention.

For example, in the embodiments described above, the open public information is a scenic image attached to the public map image, and the private information is an image personally owned by the user. In contrast, the public information and the private information do not need to be images. For example, the public information and the private information may be sounds. Alternatively, the public information and the private information do not need to be the same type of information; the public information may be a map image, and the private information may be a sound. For example, when the positional information on the map image corresponds to a sound acquisition position, the positional information and the sound acquisition position may be associated with each other. Moreover, the public information that has been described does not always need to be information obtained by, for example, an Internet search, and may be, for example, a map or moving images bought by the user. For example, a DVD of moving images of a travel guide is reproduced, and images taken by the user may be attached to the moving images. In the case of an old townscape, when the townscape appears in a biographical film and the place photographed by the user appears therein, it is possible that the images may be superimposed and displayed as a compound image. This application considers that a publication is public information. Moreover, in the sense that a personal image is associated with a background image taken by another person, it is not necessary to limit to scenes or townscapes, and it is possible to superimpose and display a microscopic image on a sample image retrieved on the Internet, or view an image of a lesion of a patient attached to an image of the inside of a body taken by a third party.

Each process according to the embodiments described above can be stored as a program executable by, for example, a CPU as a computer. Otherwise, each process can be stored and distributed in a storage medium of an external storage device such as a memory card, a magnetic disk, an optical disk, or a semiconductor memory. The CPU or the like then reads the program stored in the storage medium of the external storage device, and can execute the above-described processes when the operation of the CPU or the like is controlled by the read program.

The embodiments have been described, but the present invention is in no way limited to these embodiments. The present invention can, of course, be modified in various ways without departing from the spirit and scope of the invention.

What is claimed is:

1. An information discriminating device comprising:
   an information acquiring unit which acquires private information to be privately used by a user of the information discriminating device, the private information including both (A) a public information portion which is used as public information and which is permitted to be freely shared, and (B) a private portion which is not to be used as public information and which includes information from which a person is identifiable; and
   a control circuit which (1) discriminates the public information portion within the private information acquired by the information acquiring unit, from the private portion within the private information acquired by the information acquiring unit, (2) extracts the public information portion, (3) obtains open public information using the extracted public information portion, and (4) superimposes the private information portion on the obtained open public information.

2. The information discriminating device according to claim 1, wherein the control circuit identifies the private information having a part similar to the open public information as the private information portion.

3. The information discriminating device according to claim 1, wherein the control circuit further records supplementary information to associate the private information portion with the open public information.

4. The information discriminating device according to claim 1, wherein the private information is an image,
   the private information portion is a person part in the image, and
   the public information portion is a structure part in the image.

5. The information discriminating device according to claim 1, wherein the open public information is a scenic image group obtained by changing a photography position.

6. The information discriminating device according to claim 5, wherein when more than one private information portion are discriminated for a single scenic image, the control circuit selects one of the private information portions in accordance with at least one of (a) a degree of image edges in the single scenic image, (b) hues in the single scenic image, and (c) brightness in the single scenic image, to superimpose the selected private information portion on the open public information.

7. The information discriminating device according to claim 5, wherein when more than one private information portion are discriminated for one scenic image, the control circuit selects one of the private information portions in accordance with hues corresponding to a season, an acquisition date, a time, and a weather condition in the scenic image to superimpose the selected private information portion on the public information portion.

8. The information discriminating device according to claim 1, wherein a part of the open public information obtained includes an object found in the extracted public information portion, and wherein the control circuit obtains the open public information using a search for the object found in the extracted public information portion.

9. The information discriminating device according to claim 8, wherein the private information is an image, and wherein the object is a structure within the image.

10. The information discriminating device according to claim 9, wherein the open public information is street-view image information.

11. The information discriminating device according to claim 1, wherein the private information portion superimposed on the obtained open public information defines a superimposed image, and wherein the control circuit further (5) receives a user input permitting the superimposed image to be used as public information, and (6) responsive to receiving the user input permitting the superimposed image to be used as public information, sends the superimposed image to a public information server.

12. The information discriminating device according to claim 1, wherein the open public information obtained by the control circuit includes a sequence of images, and wherein the control circuit superimposes, sequentially, the private information portion on the obtained sequence of images.

13. The information discriminating device according to claim 1, wherein the private information is an image, the public information portion includes a structure part in the image, and the control circuit obtains open public information using the extracted public portion by searching for a scenic image including a structure similar to the structure included in the public information portion.

14. The information discriminating device according to claim 13 wherein the control circuit searches for a scenic image including a structure similar to the structure included in the public information portion using ridge lines of the structure included in the public information portion and ridge lines of the structure included in the scenic image.

15. The information discriminating device according to claim 13 wherein the control circuit searches for a scenic image including a structure similar to the structure included in the public information portion using vertical lines of the structure included in the public information portion and vertical lines of the structure included in the scenic image.

16. The information discriminating device according to claim 1, wherein the private information is a picture of a place, and
   wherein the open public information includes scenic images of at least one of (A) scenes of the place on different dates, (B) scenes of the place at different seasons, and (C) scenes of the place at different times of day.

17. An information discriminating method comprising:
   acquiring private information to be privately used by a user of an information discriminating device, the private information including both (A) a public information portion which is public information and which is permitted to be, and (B) a private portion is public information and which includes information from which a person is identifiable;
   discriminating the public information portion within the acquired private information, from the private portion within the acquired private information;
   extracting the public information portion; obtaining open public information using the extracted public information portion; and
   superimposing the private information portion on the obtained open public information.

18. A non-transitory storage medium storing a computer-readable program which causes a computer to:
   acquire private information to be privately used by a user of an information discriminating device, the private information including both (A) a public information portion which is public information and which is permitted to be, and (B) a private portion which is not to be used as public information and which includes information from which a person is identifiable;
   discriminate the public information portion within the acquired private information, from the private portion within the acquired private information;
   extract the public information portion;
   obtain open public information using the extracted public information portion; and
   superimpose the private information portion on the obtained open public information.

* * * * *